United States Patent [19]

Lewis et al.

[11] Patent Number: 6,014,697
[45] Date of Patent: Jan. 11, 2000

[54] METHOD AND APPARATUS FOR AUTOMATICALLY POPULATING A NETWORK SIMULATOR TOOL

[75] Inventors: Lundy M. Lewis, Mason, N.H.; David H. St. Onge, Pepperell; G. Michael Soper, Tyngsborough, both of Mass.

[73] Assignee: Cabletron Systems, Inc., Rochester, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,278

[22] Filed: Dec. 18, 1996

Related U.S. Application Data

[63] Continuation of application No. 08/328,810, Oct. 25, 1994, abandoned.

[51] Int. Cl.[7] .................................................. G06F 13/00
[52] U.S. Cl. .......................... 709/223; 709/225; 709/226; 709/230; 709/246; 709/249; 395/500.35; 395/500.42; 395/500.49
[58] Field of Search .................................. 395/200.1, 800, 395/500, 800.01, 500.35, 500.42, 500.49; 364/DIG. 1; 709/223, 225, 226, 230, 246, 249

[56] References Cited

U.S. PATENT DOCUMENTS

| | | | |
|---|---|---|---|
| 5,394,540 | 2/1995 | Barrington et al. | 395/500 |
| 5,423,023 | 6/1995 | Batch et al. | 395/500 |
| 5,452,227 | 9/1995 | Kelsey et al. | 364/489 |
| 5,463,563 | 10/1995 | Bair et al. | 364/490 |
| 5,495,479 | 2/1996 | Galaand et al. | 370/60 |
| 5,586,267 | 12/1996 | Chartwani et al. | 395/200.11 |
| 5,606,664 | 2/1997 | Brown et al. | 395/200.1 |

OTHER PUBLICATIONS

Fink, G.V., Innovative Network Modeling and Simulation Tool, Proceedings of the Military Communications Conference, IEEE, vol. 1, Oct. 2, 1994. pp. 159–162.

Oliveira, J.L. et al., A method to represent logical network topology information, Proceedings of the Network Operations and Management Symposium, IEEE, vol. 1, Feb. 14, 1994, pp. 196–206.

Cohen, A. et al., AMS: An integrated simulator for open systems, Proceedings of the Global Telecommunications Conference, IEEE, vol. 1, Nov. 29, 1993, pp. 656–660.

Law, A.M. et al., Simulation software for communications networks: the state of the art, IEEE Communications Magazine, vol. 32(2), Mar. 1994 US, pp. 44–50.

*Primary Examiner*—Daniel H. Pan
*Assistant Examiner*—Dzung C Nguyen
*Attorney, Agent, or Firm*—Wolf, Greenfield & Sacks, P.C.

[57] ABSTRACT

Method and apparatus for automatically populating a network simulation tool database with network topology and/or traffic information. A topology extraction tool is provided for reading the topology and traffic information in a network management system database, and translating this information into a matching data format required by the simulation tool database before writing the information to the simulation tool database. This automatic method avoids the time-consuming and error-prone prior art manual method of constructing a network model.

12 Claims, 2 Drawing Sheets

METHOD AND APPARATUS FOR AUTOMATICALLY POPULATING A NETWORK SIMULATOR TOOL

This application is a continuation of application Ser. No. 08/328,810, filed Oct. 25, 1994, abandoned.

FIELD OF THE INVENTION

The present invention is directed to a method and apparatus for automatically acquiring network topology and/or traffic information and populating a network simulation tool database with this information. The present invention ensures that the data format of the network topology and/or traffic information is consistent with the simulation tool database requirements before populating the simulation tool database.

BACKGROUND OF THE INVENTION

In order to accurately simulate the behavior of a live network, accurate network topology information must be provided to the network simulation tool. In the prior art, the simulation tools require a user to manually construct a network model. Typically, the user would construct a network model by hand with a special-purpose graphics package.

However, this prior art method is time-consuming and error-prone. In this prior art method, the user must have a conception of the model, or else consult other engineers, before building the model for the simulation tool. Consumption of time and error may result from the conceptualization process and in the manual entering of the network model. A more time-efficient and accurate means for providing topology information of a live network to the network simulator is highly desirable.

SUMMARY OF THE INVENTION

The present invention achieves this goal of efficiently and accurately providing topology and/or traffic information of a live network to the network simulation tool. The present invention automatically discovers the topology and/or traffic of a live network and sends this information to a Network Management System Database which stores this information. A Topology Extraction Tool acts as an intermediary between the Network Management System Database and the Simulation Tool Database. The Topology Extraction Tool reads the topology and/or traffic information of the live network from the Network Management System Database. It then translates this information into a matching data format required by the Simulation Tool Database before writing the information into the Simulation Tool Database.

DETAILED DESCRIPTION

Figure 1:
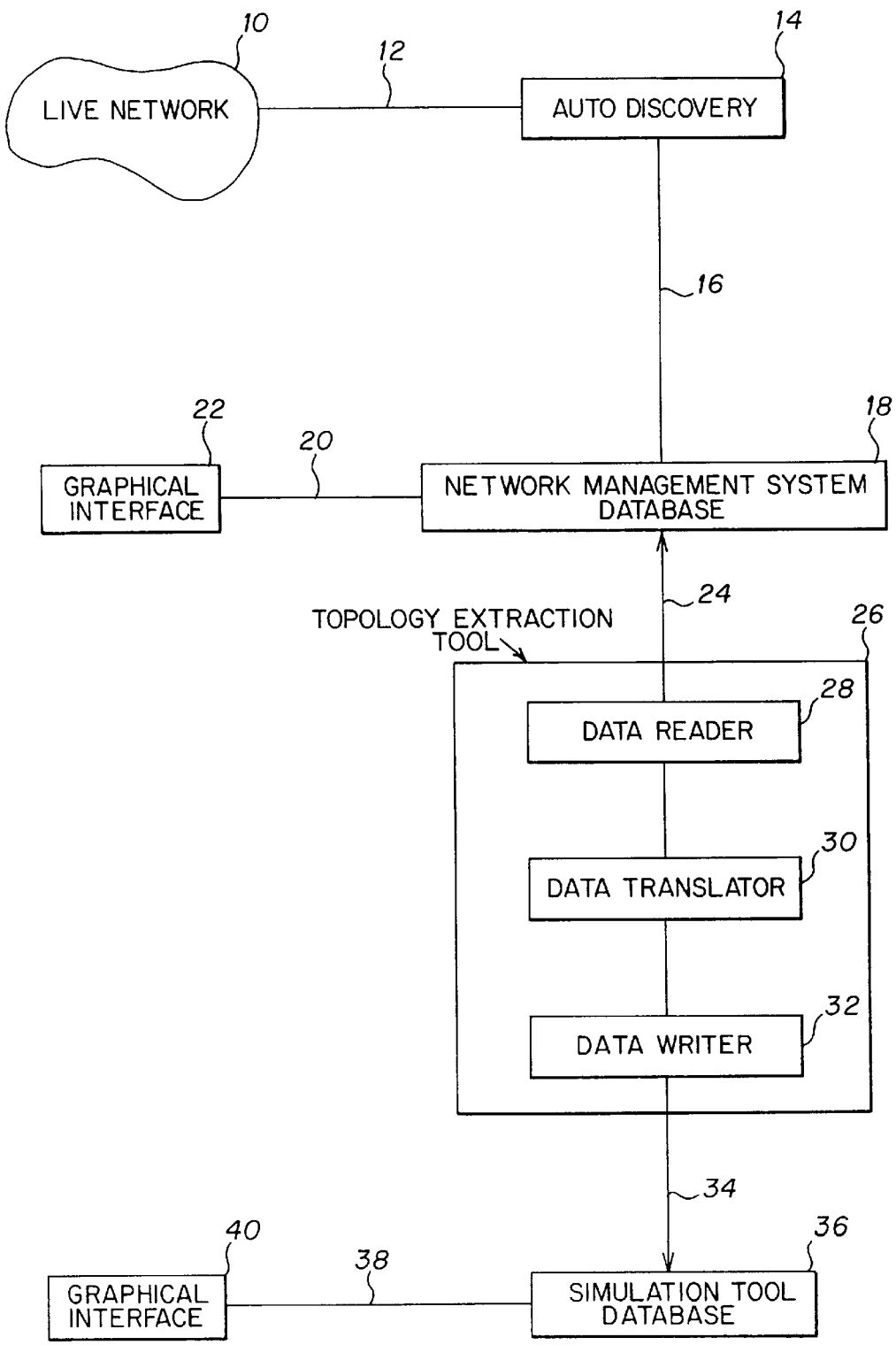
FIG. 1 is a schematic illustration of an apparatus for automatically populating a network simulator tool with network topology information.

FIG. 1 illustrates how network topology information is transferred into the network simulator tool in accordance with this invention. Referring to FIG. 1, an Auto Discovery Tool 14 discovers the topology information of the Live Network 10, via communications link 12. An example of the Auto Discovery Tool 14 is described in the copending and commonly-owned U.S. Ser. No 08/115,232 filed Sep. 1, 1993 by T.Orr et al., which is hereby incorporated by reference in its entirety. The Auto Discovery Tool then sends this topology information via communications link 16 to the Network Management System Database 18. A Graphical User Interface 22 is typically connected to the Network Management System Database (NMS) 18 via communications link 20 so that the data in the NMS Database 18 can be displayed.

An example of an NMS Database 18 is the Spectrum™ network management platform available from Cabletron Systems, Inc., of Rochester, N.H., which is also described in U.S. Pat. No. 5,261,044 and in copending and commonly owned U.S. Ser. No. 07/797,121 filed Nov. 22, 1991, now abandoned, by R. Dev et al., which are hereby incorporated by reference in their entirety. Spectrum™ implements the Auto Discovery Tool described in U.S. Ser. No. 08/115,232, filed on Sep. 1, 19993, now abandoned. Spectrum™ supports SNMP (the Simple Network Management Protocol) and other network management protocols. It is implemented in the C++ object-oriented programming language and provides a "virtual network," namely a software representation of the network being managed, including models that represent the devices (hubs, routers, workstations) and other entities (cables, buildings, etc.) associated with the network, and relations between the models. Each model includes a number of attributes and one or more inference handlers. The attributes are data which define the characteristics and status of the network entity being modeled. The inference handlers perform a specified computation, decision, action or inference. The network devices are polled or automatically update the models in the virtual network as to their status. Thus, the models represent not only the configuration of the network, but also represent its status on a dynamic basis.

The most significant element of the present invention is the Topology Extraction Tool 26. Its function is to transfer relevant data in the Network Management System Database 18 to the Simulation Tool Database 36. This function encompasses the following subfunctions:

Data Reader 28 connects to Network Management System Database 18 via communication link 24 and reads the topology information in the Network Management System Database 18;

Data Translator 30 translates the topology information from the Network Management System Database 18 into a matching data format required by the Simulation Tool Database 36; and Data Writer 32 enters the properly formatted data into the Simulation Tool Database 36 via communications link 34. A Graphical User Interface 40 is typically connected to the Simulation Tool Database 36 via communications link 38 such that the data in the Simulation Tool Database 36 can be displayed.

Figure 2:
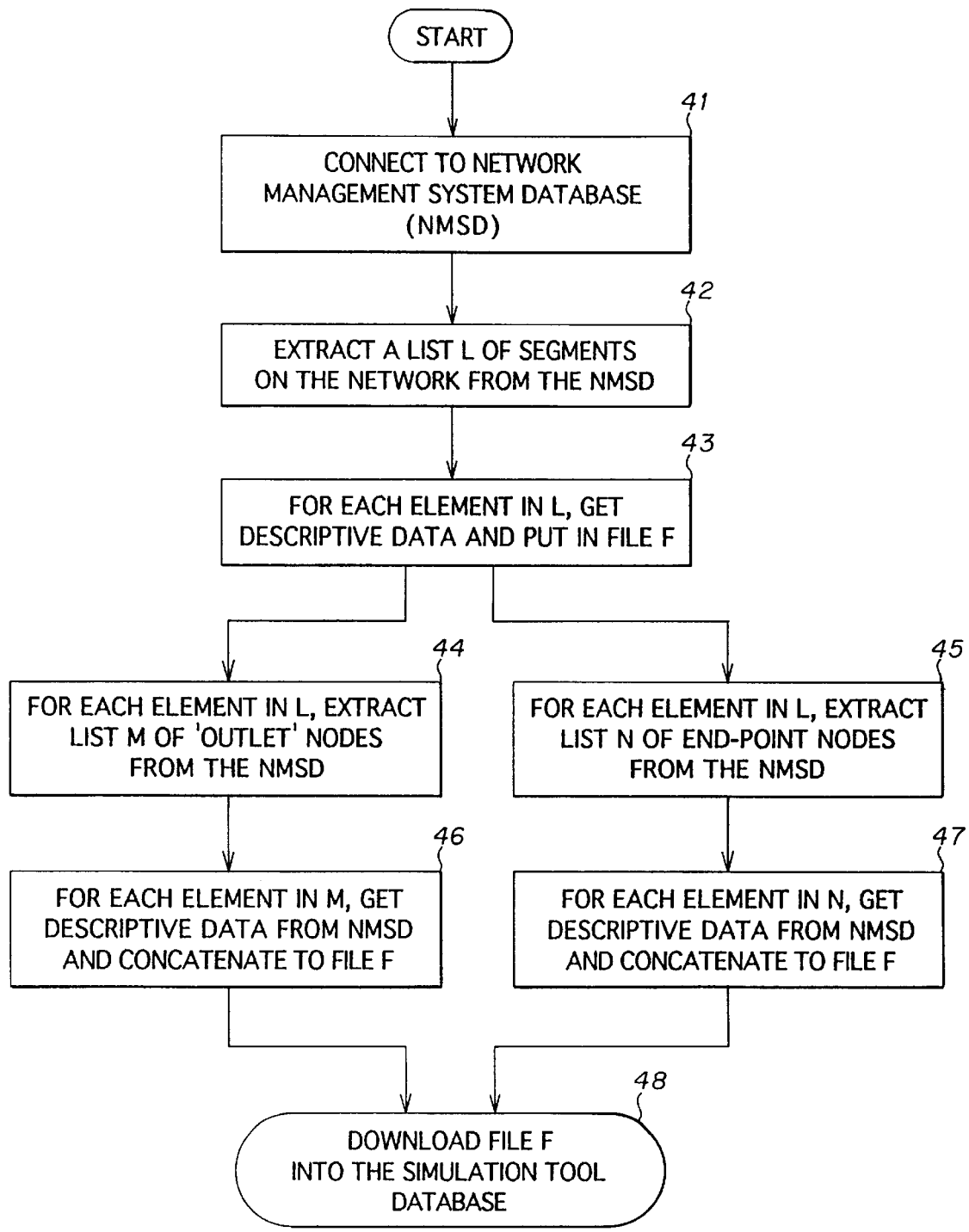
FIG. 2 is a flow chart illustrating a preferred embodiment of the Topology Extraction Tool.

FIG. 2 shows a flowchart of an example embodiment of the Topology Extraction Tool as a software program. Referring to FIG. 2, in a first step 41 the Topology Extraction Tool makes a connection to the Network Management System Database. It then extracts a list L of segments on the Live Network from the Network Management System Database (step 42). Next, the tool gets descriptive data for each element in L from the Network Management System Database and puts it into a file F (step 43).

The tool then for each element in L makes a list M of nodes that are "outlets" to other networks (step 44), and a list N of nodes that are "endpoints" in the network (step 45). [Note that steps 44 and 45 can be implemented either in parallel or consecutively, and in any order.] "Outlets" to other networks are usually routers, hubs, and bridges, while "endpoint" nodes are those that do not serve as outlets, such as workstations, printers, etc. The Topology Extraction Tool then gets descriptive data for each element in M from the Network Management System Database and concatenates it to file F (step 46), and gets descriptive data for each element in N from the Network Management System Database and concatenates it to file F (step 47). Finally, the file F is downloaded into the Simulation Tool Database (step 48).

An example code for this preferred embodiment of the Topology Extraction Tool is shown in Appendix A. This code is implemented in C++ and a UNIX Shell language and carries out all of the steps in the flowchart of FIG. 2 except the last step of downloading into the Simulation Tool Database. However, the step of downloading a file into various simulation tool databases available in the industry would be readily implemented by one skilled in the art, for example by building a tool to import the second form of topology information into the Simulation Tool Database. An example of the Simulator Tool is "Comnet" available from CACI Products Co., 345 N. York Road, Hatboro, Pa. 19040.

Appendix B shows a shortened version of a sample output file F from the code of Appendix B. The sample output file illustrates the list of the segments (Segment_Info), outlet nodes (Connectivity_Info), and endpoint nodes (Endpoint_Info), and their descriptive information to convey the topology information about the Live Network to the Simulation Tool Database. This information file can readily be downloaded to populate the Simulation Tool Database by one skilled in the art.

More specifically, the code of appendix A which performs steps 28 and 30 of FIG. 1 utilizes a first form of topology data in the Spectrum™ database which is represented by a list of "logical 2-place relations." These relations are specified as pairs of associations and can specify peer-to-peer associations or heirarchical associations. There are many such relations in the Spectrum™ database, but for the purposes of understanding the network topology we are only concerned with three of them: "Collects", "Connects_to", and "Is_Adjacent_to":

Collects
  Type: One to many
  Description: The "Collects" relation allows a model to collect information about other models. "Collects" is similar to the "Contains" relation but is applied to Spectrum's™ Topology models to determine what model types collect information through other models. Rules of this model type are checked by SpectroGRAPH™ (Spectrum's™ graphical user interface which visually presents the virtual network) when attempting to add or copy models within a Topology model.
  Examples: Network Collects a LAN LAN_802_3 Collects a device Connects_To
  Type: Many to many
  Description: The "Connects_To" relation forms a connection between two models. "Connect_To" causes a connection to be formed between a Port model and a Device or Topology model.
  Examples: LAN802_3 Connects_to a Port of a Bridge PC Connects_to a Port of a Hub Is_Adjacent_To
  Type: Many to many
  Description: The "Is_Adjacent_to relation establishes an adjacency between two models. If a SpectroGRAPH™ user draws a pipe between two models, the Is_Adjacent_to association forms between the models.
  Examples: Device Is_Adjacent_to other Device models Device Is_Adjacent_to Topology models In the Simulation Tool database 36, there is a second form of the topology data represented by the following three categories:
  1. Segment_info
  2. Connectivity_info
  3. Endpoint_info.

The first category lists the major segments in the network. The second category lists nodes in these segments that are "outlets" to other segments; such outlets are usually routers, hubs and bridges. The third category lists endpoint nodes (i.e., those that do not serve as outlets), such as workstations, printers, etc. Categories 1, 2 and 3 provide sufficient information to graphically illustrate all connections in the network. This is just one example of a method for automatically populating the network simulation tool database, and the invention is not limited thereto.

The above example illustrated the extraction of network topology information from a network management system such as a network management platform However, the invention also includes the extraction of other information such as network traffic information, also known as "historical traffic data." Such traffic information could be extracted in the same fashion from the following Network Management Systems: Sniffer by Network General Corporation, 4200 Bohannon Drive, Menlo Park, Calif. 94025; Netmetrix by Hewlett-Packard Corp., 1 Tara Blvd., Nashua, N.H. 03062; LANalyzer by Novell, Inc., 122 East 1700 South, Provo, Utah 84606-6194. These later systems are usually called network monitors or network analyzers. As used herein, "Network Management System" is defined broadly and includes a network management platform (e.g., Spectrum™), a network monitor, or a network analyzer.

Having thus described various embodiments of the present invention, additional alterations, modifications and improvements will readily occur to those skilled in the art. Accordingly, the foregoing description is by way of example only, and not intended to be limiting. The invention is limited only as defined in the following claims and the equivalents thereto.

We claim:

1. A network topology extraction tool comprising:

an autodiscovery tool, coupled to a live network, that automatically, and in real-time, polls devices on the live network to generate a first form of topology and traffic information of the live network, the first form of topology and traffic information being stored in a network management system database;

a data reader coupled to the network management system database to read the first form of topology and traffic information from the network management system database;

a data translator coupled to the data reader that translates the first form of topology and traffic information into a second form of topology and traffic information matching a data format required by a simulation tool database; and a data writer, coupled between the data translator and the simulation tool database, that writes the second form of topology and traffic information into the simulation tool database.

2. A system for automatically acquiring and storing topology and traffic information of a live network for use in a network simulation tool, the system comprising:

an autodiscovery tool coupled to the live network that automatically, and in real time, polls devices on the live network and discovers topology and traffic information of the live network and which generates a first form of topology and traffic information;

a network management system database coupled to the autodiscovery tool that stores the first form of topology and traffic information;

a simulation tool database that stores a second form of topology and traffic information, the second form of topology and traffic information matching a data format required by the simulation tool database; and a topology extraction tool, coupled between the network management system database and the simulation tool database, that reads the first form of topology and traffic information from the network management system database, translates the first form of topology and traffic information into the second form of topology and traffic information, and writes the second form of topology and traffic information into the simulation tool database.

3. The system of claim 2 further comprising:

a graphical user interface coupled to the network management system database that displays the first form of topology and traffic information.

4. The system of claim 2, further comprising:

a graphical user interface coupled to the simulation tool database that displays the second form of topology and traffic information.

5. A method of transferring topology and traffic information of a live network from a network management system database to a simulation tool database, the method comprising:

a) automatically, and in real time, polling devices on the live network thereby discovering and providing topology and traffic information of the live network to the network management system database;

b) reading the topology and traffic information from the network management system database to generate a first form of topology and traffic information;

c) translating the first form of topology and traffic information into a second form of topology and traffic information matching a data format required by the simulation tool database; and d) writing the second form of topology and traffic information into the simulation tool database.

6. The method as recited in claim 5, wherein reading the first form of topology and traffic information comprises:

retrieving a list of a plurality of segments from the network management system database;

retrieving, for each segment of the plurality of segments, descriptive data from the network management system database including a list of nodes on each segment; and determining, for each segment of the plurality of segments, which nodes on each segment are outlets to another network and which nodes on each segment are not outlets to another network.

7. The method as recited in claim 6, wherein reading the first form of topology and traffic information further comprises:

retrieving, for each determined outlet, descriptive data from the network management system database; and retrieving, for each determined non-outlet, descriptive data from the network management system database.

8. A method of automatically acquiring and storing topology and traffic information of a live network, for use in a network simulation tool, the method comprising:

a) automatically, and in real time, polling devices on the live network thereby discovering topology and traffic information of the live network and generating a first form of the topology and traffic information;

b) storing the first form of topology and traffic information in the network management system database;

c) reading the first form of topology and traffic information from the network management system database;

d) translating the first form of topology and traffic information into a second form of topology and traffic information matching a data format required by a simulation tool database; and e) writing the second form of topology and traffic information into the simulation tool database.

9. The method according to claim 8, further comprising:

displaying the first form of topology and traffic information.

10. The method according to claim 8, further comprising:

displaying the second form of topology and traffic information.

11. The method as recited in claim 8, wherein reading the first form of topology and traffic information comprises:

retrieving a list of a plurality of segments from the network management system database;

retrieving, for each segment of the plurality of segments, descriptive data from the network management system database including a list of nodes on each segment; and determining, for each segment of the plurality of segments, which nodes on each segment are outlets to another network and which nodes on each segment are not outlets to another network.

12. The method as recited in claim 11, wherein reading the first form of topology and traffic information further comprises:

retrieving, for each determined outlet, descriptive data from the network management system database; and retrieving, for each determined non-outlet, descriptive data from the network management system database.

* * * * *